(12) United States Patent
Su

(10) Patent No.: US 6,577,087 B2
(45) Date of Patent: Jun. 10, 2003

(54) MULTILEVEL DC LINK INVERTER

(75) Inventor: Gui-Jia Su, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 115 days.

(21) Appl. No.: 09/853,133

(22) Filed: May 10, 2001

(65) Prior Publication Data

US 2002/0175644 A1 Nov. 28, 2002

(51) Int. Cl.[7] .................................................. H02P 5/06
(52) U.S. Cl. ........................ 318/254; 318/439; 318/801
(58) Field of Search .................................. 318/138, 254, 318/439, 700–701, 721–722, 801

(56) References Cited

U.S. PATENT DOCUMENTS 5,929,590 A * 7/1999 Tang ........................... 318/254
6,051,942 A * 4/2000 French ........................ 318/254
6,060,859 A * 5/2000 Jonokuchi ................... 318/801

* cited by examiner

Primary Examiner—Marlon T. Fletcher
(74) Attorney, Agent, or Firm—Quarles & Brady LLP

(57) ABSTRACT

A multilevel DC link inverter and method for improving torque response and current regulation in permanent magnet motors and switched reluctance motors having a low inductance includes a plurality of voltage controlled cells connected in series for applying a resulting dc voltage comprised of one or more incremental dc voltages. The cells are provided with switches for increasing the resulting applied dc voltage as speed and back EMF increase, while limiting the voltage that is applied to the commutation switches to perform PWM or dc voltage stepping functions, so as to limit current ripple in the stator windings below an acceptable level, typically 5%. Several embodiments are disclosed including inverters using IGBT's, inverters using thyristors. All of the inverters are operable in both motoring and regenerating modes.

19 Claims, 20 Drawing Sheets

MULTILEVEL DC LINK INVERTER

This invention was made with Government support under Contract No. DE-AC05-00OR22725 to UT-Battelle, LLC, awarded by the U.S. Department of Energy. The Government has certain rights in this invention.

BACKGROUND OF THE INVENTION

The field of the invention is electronic controls for motors, including brushless DC motors, synchronous ac motors and switched reluctance motors.

Permanent magnet motors are excellent candidates for traction drives in electric/hybrid-electric vehicle applications because of their higher efficiency. Due to a long effective air gap, PM motors tend to have low inductance. Recent design techniques for high power PM motors (rated at several tens of kWs) for electric vehicle and hybrid electrical vehicle propulsion have used an iron-less stator structure to eliminate stator iron loss. This design also reduces stator inductance well below 100 $\mu$H. While these types of very low inductance PM motors have the advantages of fast current control response and a linear relationship between current and its developed torque, they impose stringent current regulation demands for the inverter to obtain acceptable current ripple, which should be typically below 5%.

A PM motor can be excited in an ac synchronous mode or brushless dc (BLDC) mode using a dc link inverter to control three-phase switching of current in the windings of a 3-phase motor. The latter excitation provides a low cost drive system, which is well suited for PM motors having a trapezoidal back EMF. There is, however, in the known inverter technology, a problem of unacceptable current ripple with low inductance PM motors.

The maximum current ripple is inversely proportional to the motor inductance and the inverter switching frequency. A standard inverter with the most commonly used IGBT switching devices will produce an unacceptable maximum current ripple of 25% due to the IGBT's switching frequency, which is limited to 20 kHz. This high current ripple not only causes additional motor losses but also requires that the inverter be rated higher to handle the high peak current.

For a given switching frequency, the current ripple can be reduced by adding an external inductor in each phase to increase the inductance. However, inductors rated for high current rating are bulky and this produces a large inductance which undesirably slows current control response. Another method of reducing current ripple uses a step-down chopper to regulate the dc voltage applied to the inverter. This also requires an additional inductor. These approaches have not resulted in a control with the desired features of operation and construction.

SUMMARY OF THE INVENTION

In order to reduce current ripple and use permanent magnet (PM) motors having very low inductance, the invention provides a multilevel voltage source for the dc source of a multiple phase bridge inverter. The multilevel voltage source has multiple voltage-controlled cells cascaded to provide the necessary voltage to the motor. To regulate motor current with low ripple, the output voltage of the cells is adjusted through dc voltage level stepping and pulse width modulation (PWM) depending on the amplitude of the motor back electromotive force (EMF).

It is a primary object of the invention to reduce current ripple in a PM motor powered by a dc link inverter to below 5% over the full speed range of the motor.

It is a further object of the invention to provide controls for brushless DC motors, AC synchronous motors and switched reluctance motors having low inductance.

Other objects and advantages of the invention, besides those discussed above, will be apparent to those of ordinary skill in the art from the description of the preferred embodiments which follows. In the description reference is made to the accompanying drawings, which form a part hereof, and which illustrate examples of the invention. Such examples, however are not exhaustive of the various embodiments of the invention, and therefore reference is made to the claims which follow the description for determining the scope of the invention.

BRIEF DESCRIPTION OF THE DRAWINGS

FIG. 1b is a graph of trapezoidal back emf and switching conduction periods vs. time for the PWM inverter of FIG. 1a;

FIG. 1c is a schematic of an equivalent circuit for the PWM inverter and the PM motor of FIG. 1a;

FIG. 1d is a current waveform for current ripple in inverter of FIG. 1a;

FIG. 7b is a graph of trapezoidal motor inductance and switching conduction periods vs. time for the PWM inverter of FIG. 7a;

FIG. 9b is a graph of trapezoidal back emf and switching conduction periods vs. time for the PWM inverter of FIG. 9a.

DETAILED DESCRIPTION OF THE PREFERRED EMBODIMENTS

Figure 1:
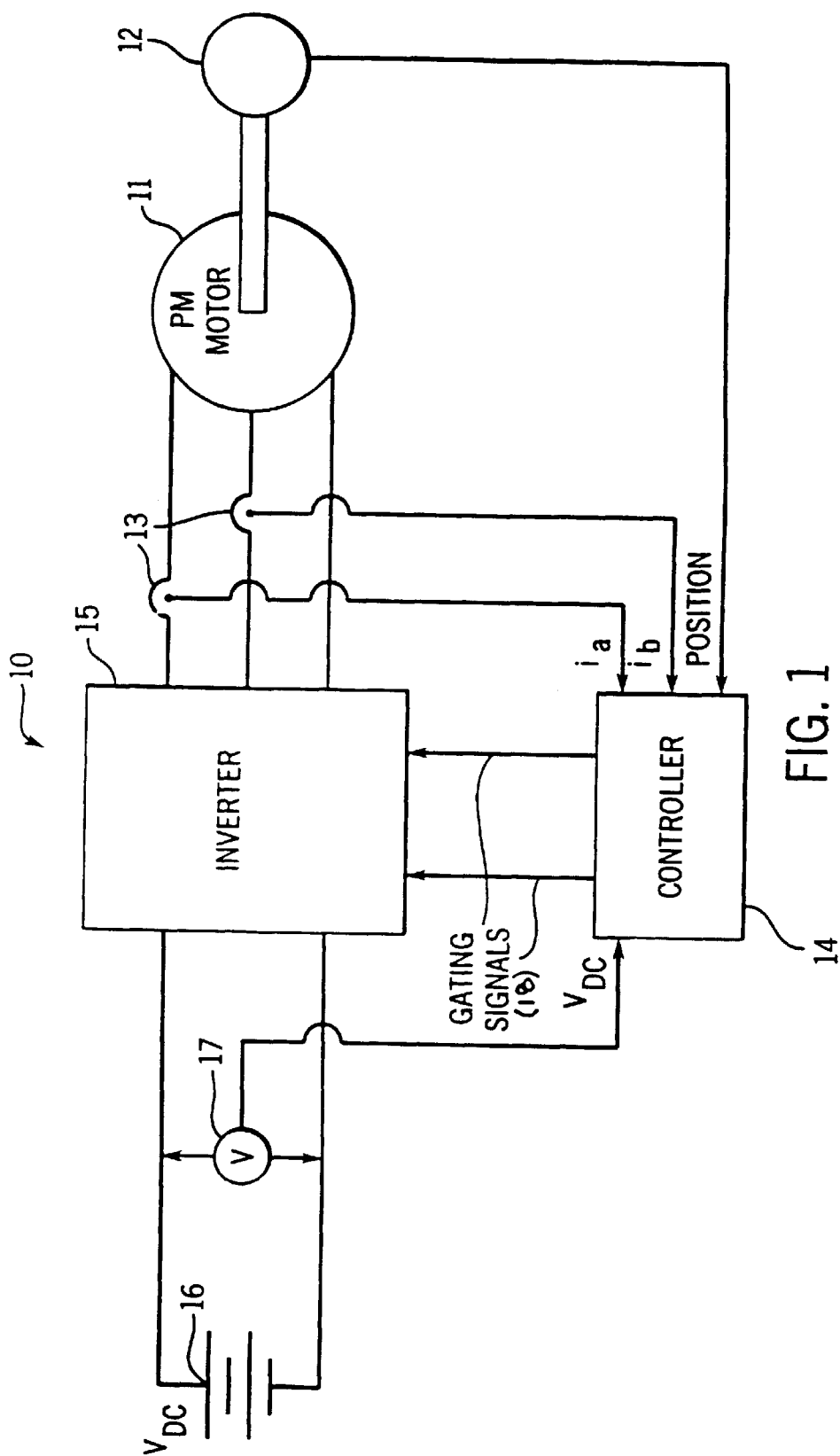
FIG. 1 is a block diagram of a motor control of the present invention connected to control a brushless dc motor.

Referring to FIG. 1, the present invention is embodied in a motor control system 10 for controlling a motor 11, which may be a permanent magnet (PM) motor, such as a brushless dc motor or an ac synchronous motor, or in another embodiment described herein, may be a switched reluctance motor. In permanent magnet (PM) motors, the permanent magnets are positioned on the rotor, while the stator has windings for carrying the phase currents. The permanent magnets are typically formed of rare earth magnetic materials such as NdFeB (neodymium-iron-boron). When the rotor of these motors rotates, the rotating magnets induce a back EMF voltage in the stator. The magnitude of the back EMF increases with the speed of the rotor. The waveform of the back EMF can be either sinusoidal in the case of a permanent magnet synchronous motor or it can be trapezoidal in the case of a brushless dc motor.

As further seen in FIG. 1, the motor control system 10 includes an inverter 15 connected to three phases of the PM motor 11. The inverter 15 receives dc power from a dc power source 16 to be described in more detail below. A controller 14 transmits gating signals to control the firing of semiconductor switches in the inverter 15 for the three phases of the motor 11. The controller 14 senses the dc voltage through a dc voltage sensor 17. The controller 14 also receives rotor position information from one or more optional position sensors 12, which may be coupled to the motor output shaft, or positioned near the rotor as described below. Some brushless dc motor controls are classified as sensorless, meaning that they do not utilize position sensors. The controller 14 also receives current feedback for current sensors 13 in two of the three phase supply lines to the motor. From this current information, the controller can calculate current in the third phase.

The logic controller 14 preferably includes a microelectronic CPU and associated program memory and data memory. A program is stored in the program memory and is executed by the CPU to perform a current control loop and other basic control methods well known in the art of motor control.

Figure 1A:
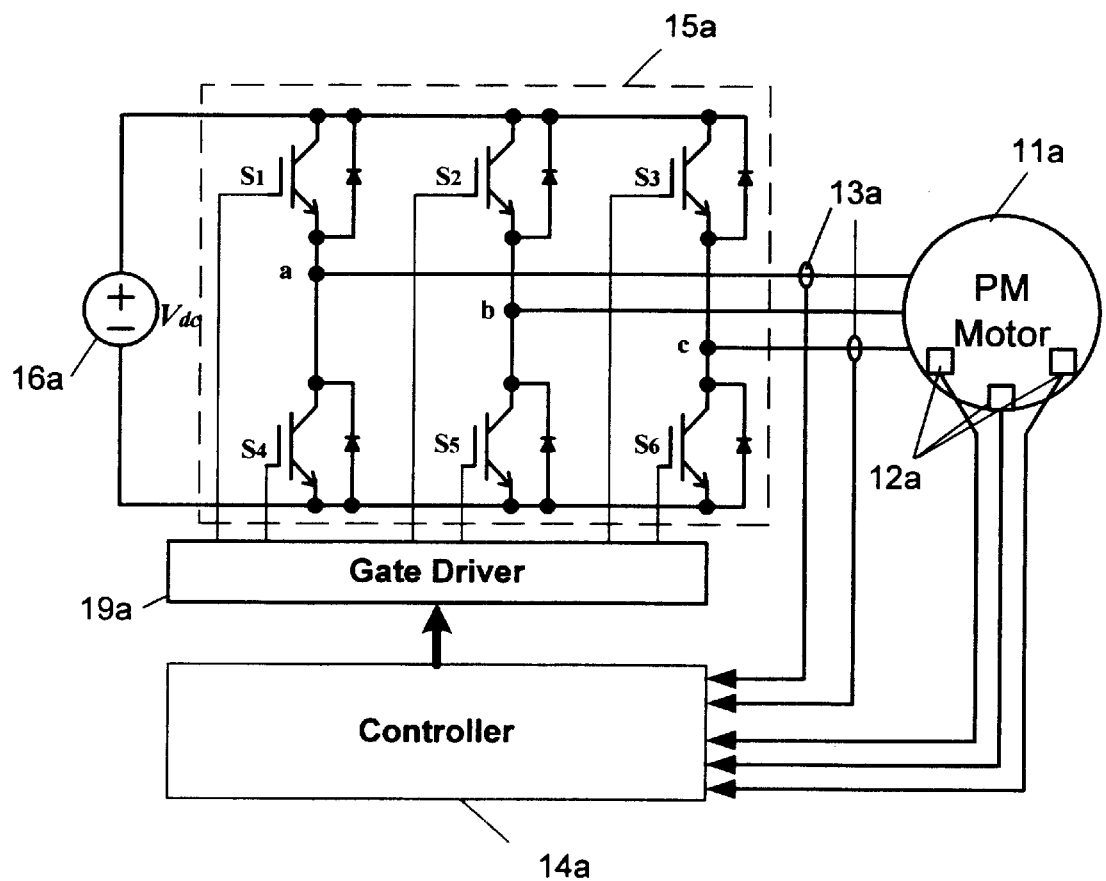
FIG. 1a is a detail schematic of PWM inverter of the prior art.
Figure 1B:
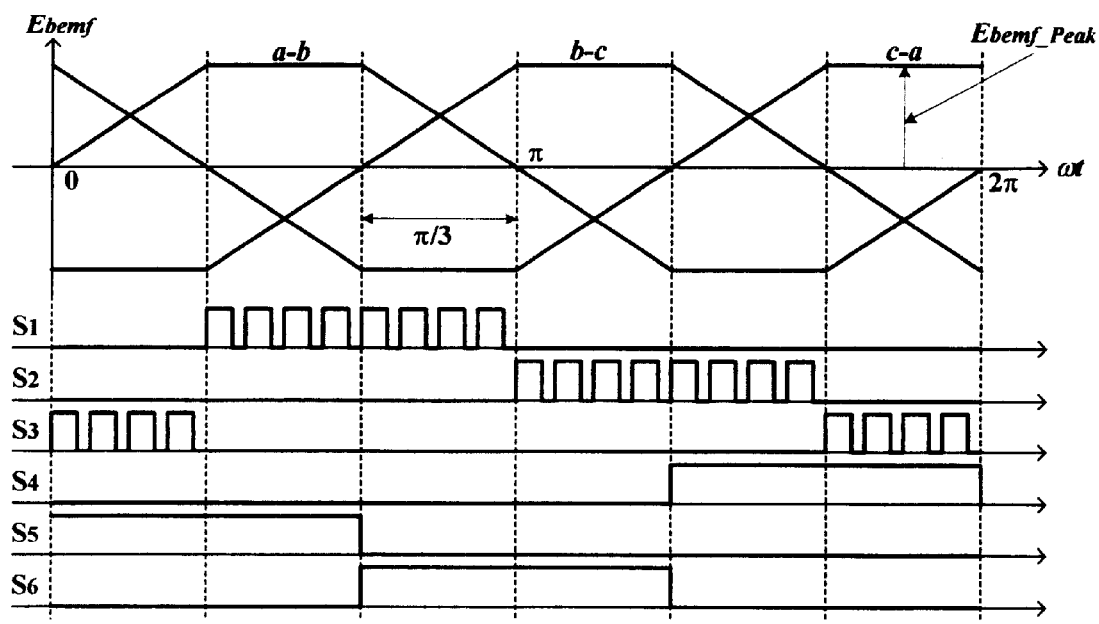
Figure 1C:
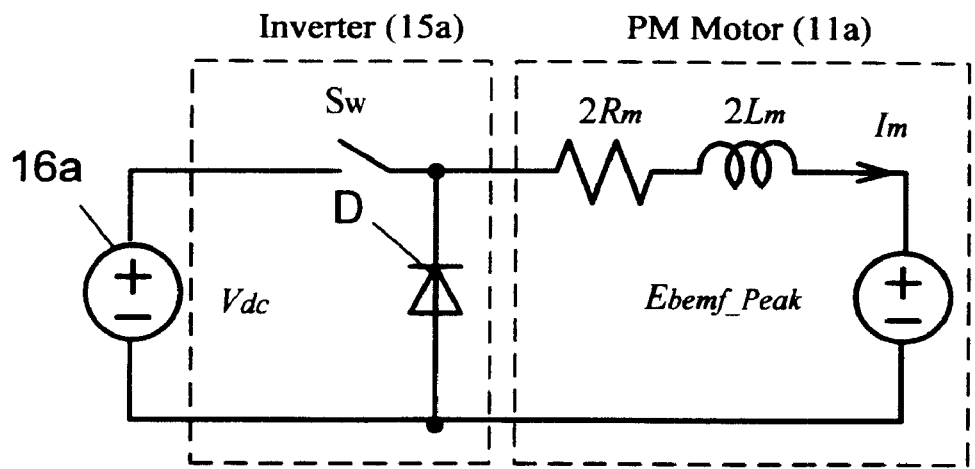

Motor current ripple for inverter 15a and brushless PM motor 11a (FIG. 1a) can be analyzed by an equivalent circuit (FIG. 1c). FIG. 1a illustrates a typical PWM inverter 15a of the prior art with six IGBT's (insulated gate bipolar transistors) S1–S6 which switch at appropriate intervals. Bypass diodes are connected in parallel to and across the respective six IGBT's S1–S6 to allow transient currents associated with switching the IGBT's to bypass the IGBT's. Position sensors 12a such as Hall-effect devices are positioned inside the motor to sense rotor position and signals are transmitted to a controller 14a which calculates speed and generates gate signals through gate driver circuit 19a to the inverter 15a. Current sensors 13a provide signals to the controller 14a as part of the current loop regulation.

FIG. 1b shows the three phase-to-phase back EMFs, a–b, b–c and c–a, which would be developed during operation. Only two of the three phase stator windings are excited at one time. To properly commutate the stator currents, rotor position information is detected with position sensors 12a as mentioned above. There are six combinations of the stator excitation, S3–S5, S1–S5, S1–S6, S2–S6, S2–S4 and S3–S4 over a fundamental cycle with each combination lasting for a phase period of $\pi/3$, as depicted in FIG. 1b. The corresponding two switches in each period can perform pulse width modulation to regulate the motor current. To reduce current ripple, it is, however, often useful to have one switch doing PWM while keeping the other switch conducting. For such a PWM scheme, an equivalent circuit is given in FIG. 1c, where $R_m$ and $L_m$ are the per-phase resistance and inductance including the mutual inductance between the two conducting windings, respectively, the PWM switch is $S_W$ and the diode D is the diode of the other switch in the same phase leg of the PWM switch. The commutation overlap during mode transition can be ignored for low inductance motors and is therefore not considered in the equivalent circuit.

Figure 1D:
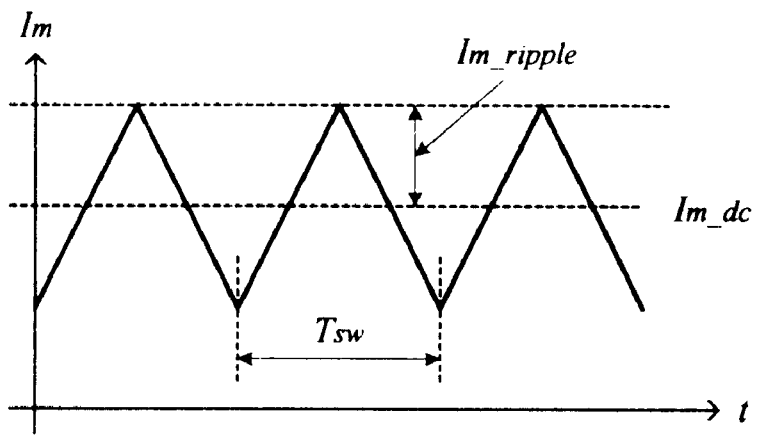

Ignoring the stator coil resistance, current ripple, defined as the peak deviation from the average current as shown in FIG. 1d, at steady state and continuous conduction mode can be determined by the following equation.

$$I_{m\_ripple} \approx \frac{1}{4L_m f_{SW}}\left(1 - \frac{E_{bemf\_peak}}{V_{dc}}\right)E_{bemf\_peak} \qquad (1)$$

where $f_{sw}$: inverter switching frequency, $f_{sw}=1/Tsw$ $V_{dc}$: inverter dc link voltage, $E_{bemf\_peak}$: peak phase-to-phase back EMF.

Assuming the back EMF is linearly related to the motor speed, N, by $E_{bemf\_peak}=K_{bemf}N$, where $K_{bemf}$ is a constant determined by the motor, equation (1) can be rewritten as $$I_{m\_ripple} \approx \frac{1}{4L_m f_{SW}}\left(1 - \frac{K_{bemf}N}{V_{dc}}\right)K_{bemf}N. \qquad (2)$$

The maximum current ripple can be determined by $$I_{m\_ripple(max)} \approx \frac{V_{dc}}{16L_m f_{SW}} \quad \text{at} \quad N = \frac{V_{dc}}{2K_{bemf}}. \qquad (3)$$

Figure 2:
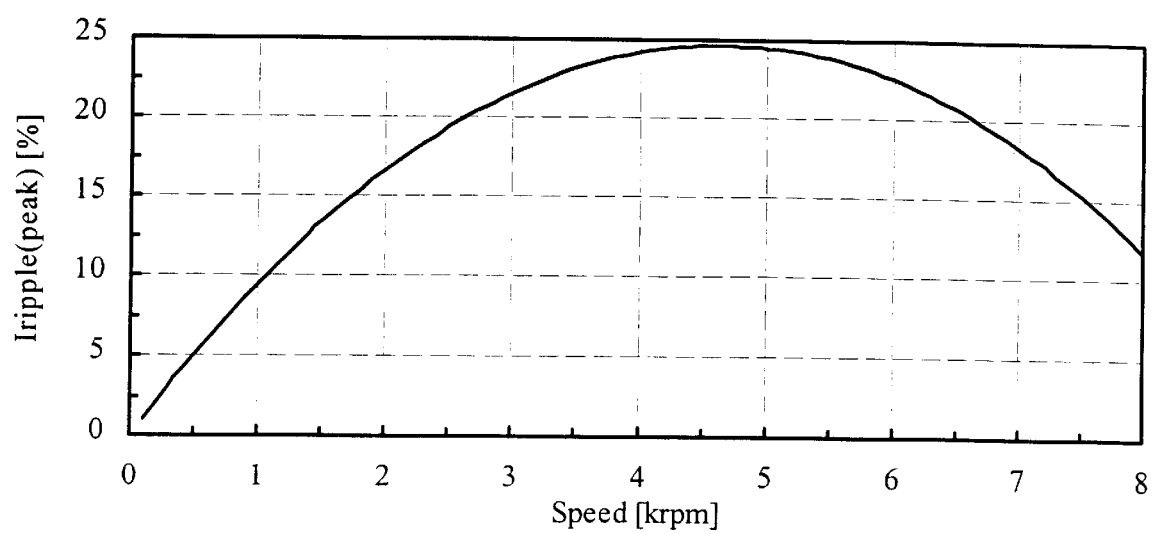
FIG. 2 is a graph of current ripple vs. speed for a specific brushless dc motor using a motor control of the prior art.
Figure 3:
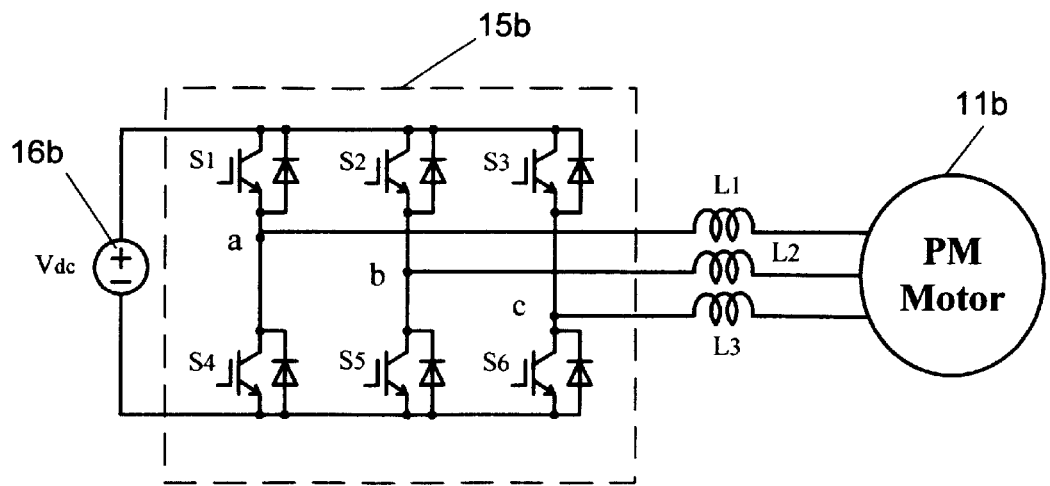
FIG. 3 is an electrical schematic of a dc link inverter using additional inductors to control current ripple.

The maximum current ripple is inversely proportional to the motor inductance and the inverter switching frequency. A plot of current ripple as a percentage of the rated current vs. speed is shown in FIG. 2 for a 30 kW BLPM motor having a rated current of 110 amps and a phase inductance of Lm=37.5 $\mu$H with the inverter switching at 20 kHz and $V_{dc}$=325V. It shows that a standard inverter with the most commonly used IGBT switching devices will produce an unacceptable maximum current ripple of 25% due to the IGBT's limited switching frequency, which is limited to 20 kHz. This high ripple current percentage $I_{ripple(peak)[\%]}$ not only causes additional motor losses but also requires that the inverter be rated higher than otherwise would be to handle high peak current. For a given switching frequency, one can reduce the current ripple by adding external inductors, $L_1$, $L_2$, and $L_3$, to increase the inductance as shown in FIG. 3.

Figure 4:
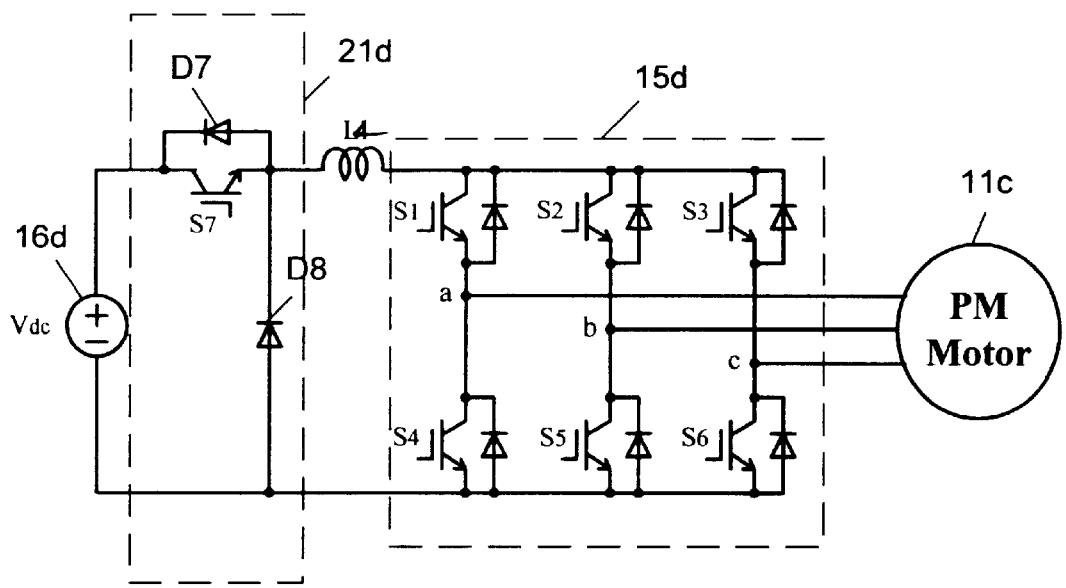
FIG. 4 is an electrical schematic of a dc link inverter using a step down chopper circuit to control current ripple.

However, inductors rated for high current rating are bulky and a large inductance undesirably slows current control response. FIG. 4 shows another way to reduce current ripple by using a step-down chopper including seventh IGBT S7, diodes D7 and D8 and inductor $L_4$ to regulate the dc voltage. This requires the additional inductor, $L_4$.

Figure 5A:
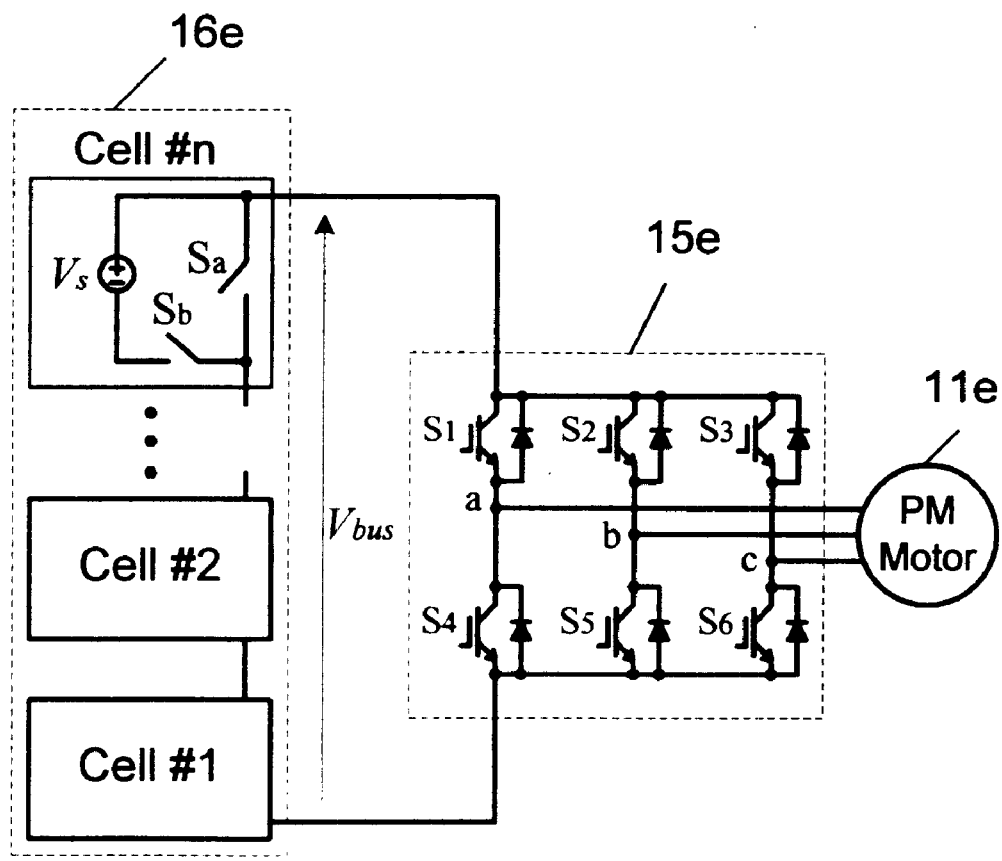
FIG. 5a is a first electrical schematic representation of a dc link inverter using a multilevel dc voltage source of the present invention.

FIG. 5a shows the motor control of the present invention, which comprises an incremental dc supply circuit 16e and a multiphase bridge inverter 15e. The multilevel dc supply circuit 16e is formed by connecting a number of cells #1, #2, . . . #n in series with each cell having a voltage source Vs controlled by two control switches Sa and Sb. The two switches, Sa and Sb, operate in a toggle fashion. The cell source is bypassed with Sa on and Sb off or adds to the dc link voltage by reversing the switches.

Figure 5B:
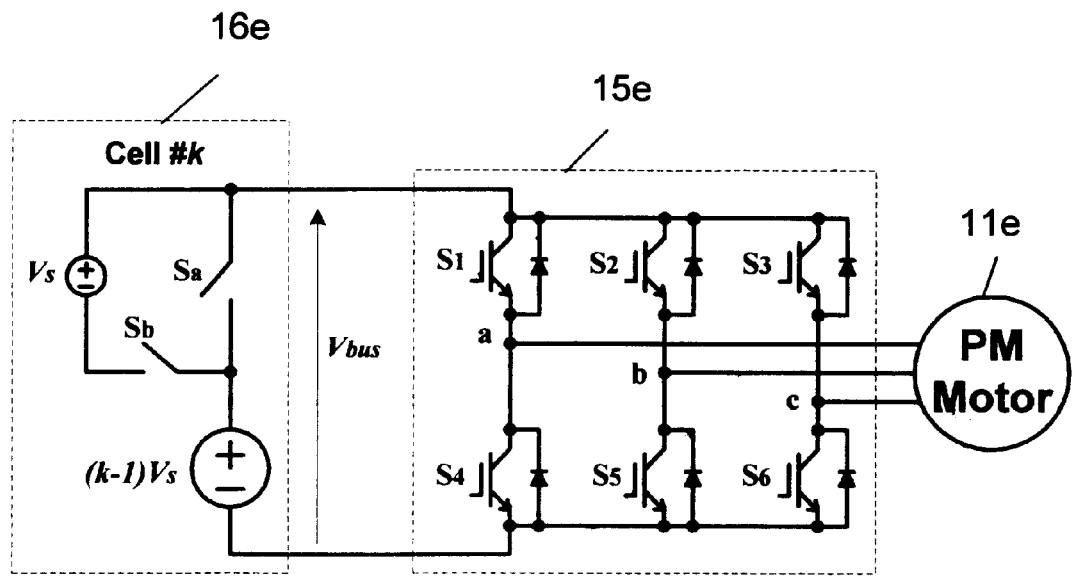
FIG. 5b is a second electrical schematic representation of a dc link inverter using a multilevel dc voltage source of the present invention.

To control a PM motor 11e in BLDC mode, the bridge inverter 15e is used only to commutate the motor phase currents without doing PWM for current regulation. The current regulation is performed by the cell switches. For a given range of back EMF defined by its minimum $E_{bemf\_Peak}$(min) and maximum $E_{bemf\_Peak}$(max), k cells are active but only one of the k number of cells, performs PWM, as shown in FIG. 5b. The required number of active cells, k, is determined by $$\frac{E_{bemf\_Peak}(max)}{V_s} < k < \frac{E_{bemf\_Peak}(min)}{V_s} + 1. \quad (4)$$

where Vs is the source voltage of each cell. Since n cells cover the full voltage range, and with 1<=k<=n, the number of active cells increases with motor speed.

Alternatively, for a given number of cells, the controllable speed range is defined by $$\frac{(k-1)V_s}{K_{bemf}} < N < \frac{kV_s}{K_{bemf}}. \quad (5)$$

Figure 5C:
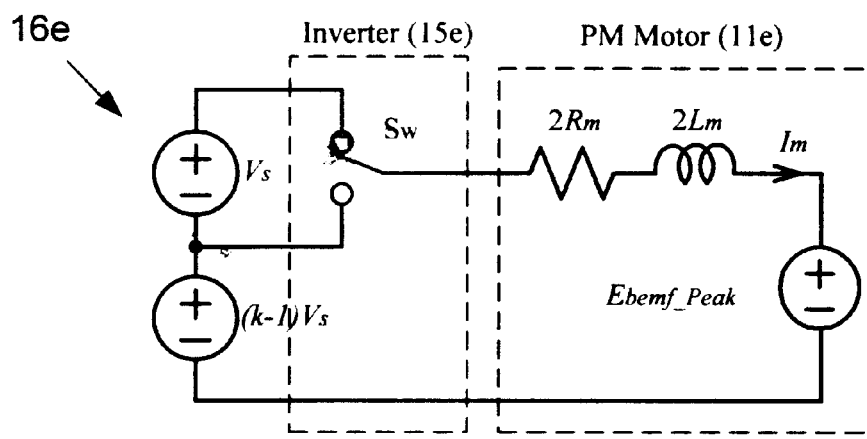
FIG. 5c is an equivalent circuit schematic for the multilevel dc voltage source of FIGS. 5a and 5b.

The current ripple can be derived based on the equivalent circuit shown in FIG. 5c as follows.

$$I_{m\_ripple} \approx \frac{k^2 V_s}{4L_m f_{SW}}\left(1 - \frac{K_{bemf}N}{kV_s}\right)\left(\frac{K_{bemf}N}{kV_s} - \frac{k-1}{k}\right) \quad (6)$$

The maximum current ripple can be determined by $$I_{m\_ripple(max)} \approx \frac{V_s}{16L_m f_{SW}} \quad \text{at} \quad N = \frac{(2k-1)V_s}{2K_{bemf}}. \quad (7)$$

Figure 5D:
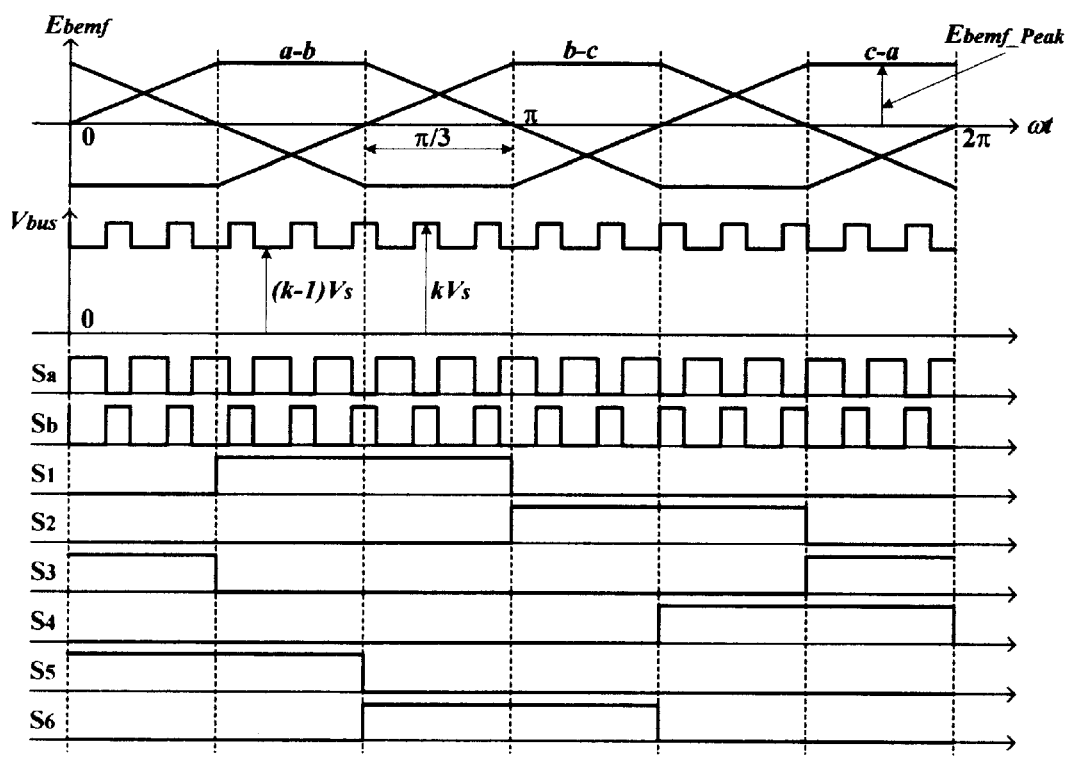
FIG. 5d is a graph of trapezoidal back emf and switching conduction periods vs. time for the PWM inverter of FIGS. 5a and 5b.

From equations (3) and (7), the maximum current ripple is reduced by a factor of Vdc/Vs, i.e. the number of cells. FIG. 5d shows the back EMF and switching conduction periods for the inverter of FIGS. 5a and 5b.

Figure 6A:
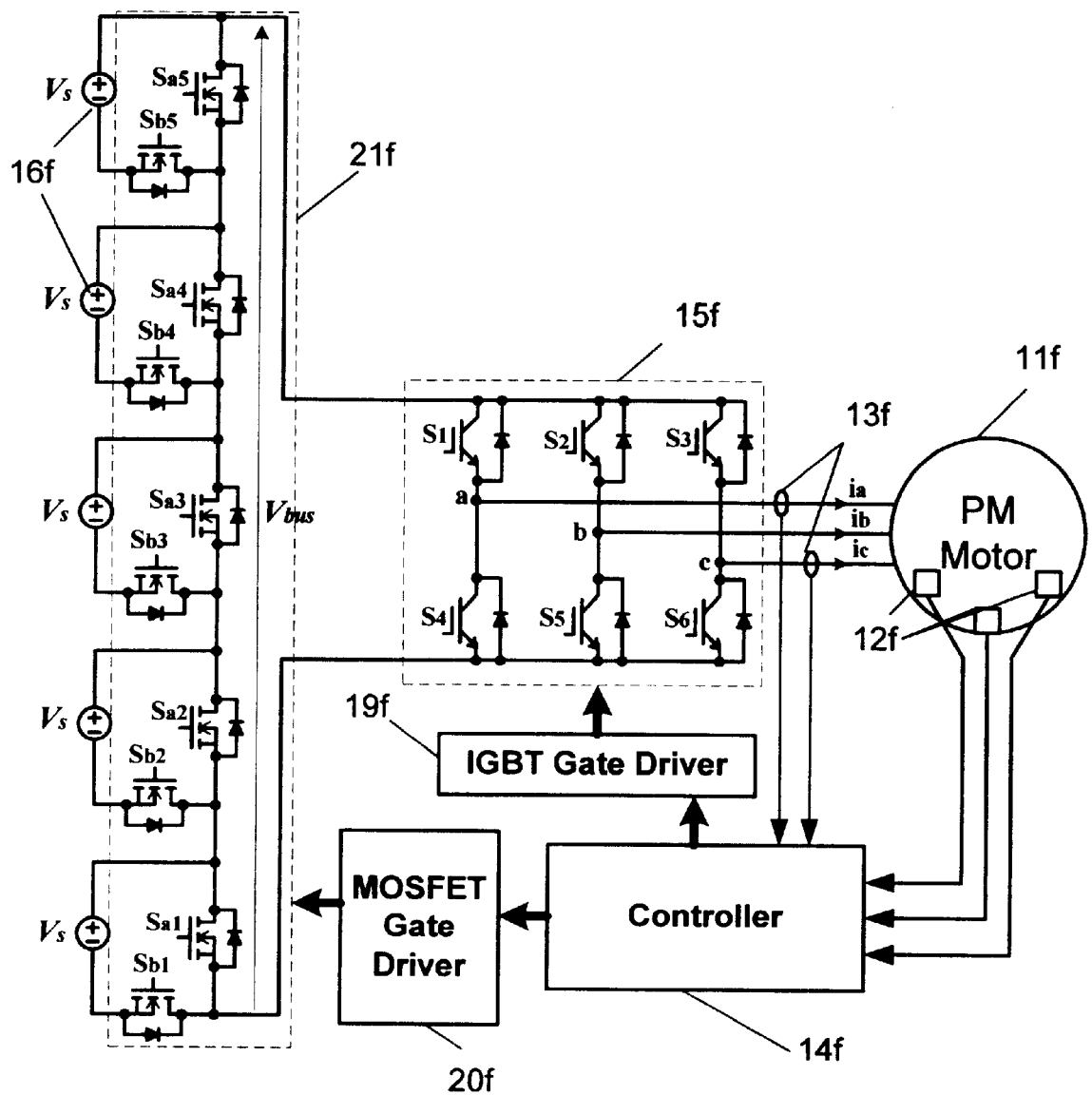
FIG. 6a is a more specific example of the multilevel dc voltage source of the present invention.

FIG. 6a shows an embodiment of the invention using power MOSFETS as switches 5a and 5b in each cell. IGBT's are used in the inverter 15f. Current and position signals are transmitted from current sensors 13f and position sensors 12f to controller 14f, which then calculates speed and current commands and transmits commutation signals through IGBT gate drivers 19f. The controller 14f controls the number of voltage cells 16f which are operated in series by transmitting signals to the cell controller 21f (Sa1–Sa5 and Sb1–Sb5) through MOSFET gate drivers 20f.

Figure 6B:
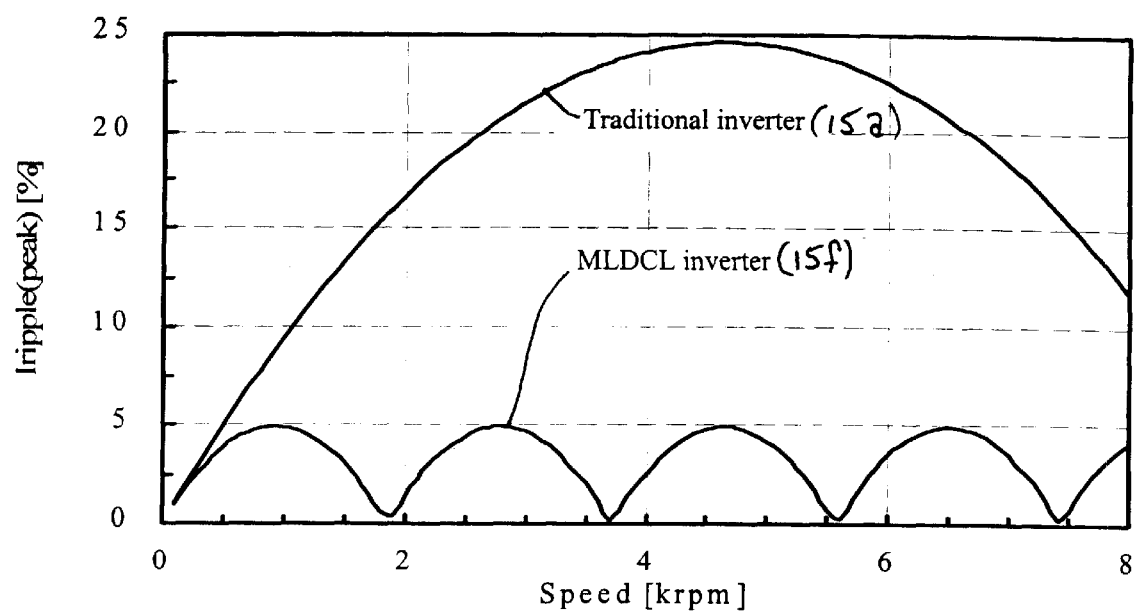
FIG. 6b is a graph of current ripple vs. speed for a conventional inverted of the prior art and for a multilevel dc voltage source inverter of the present invention.
Figure 6C:
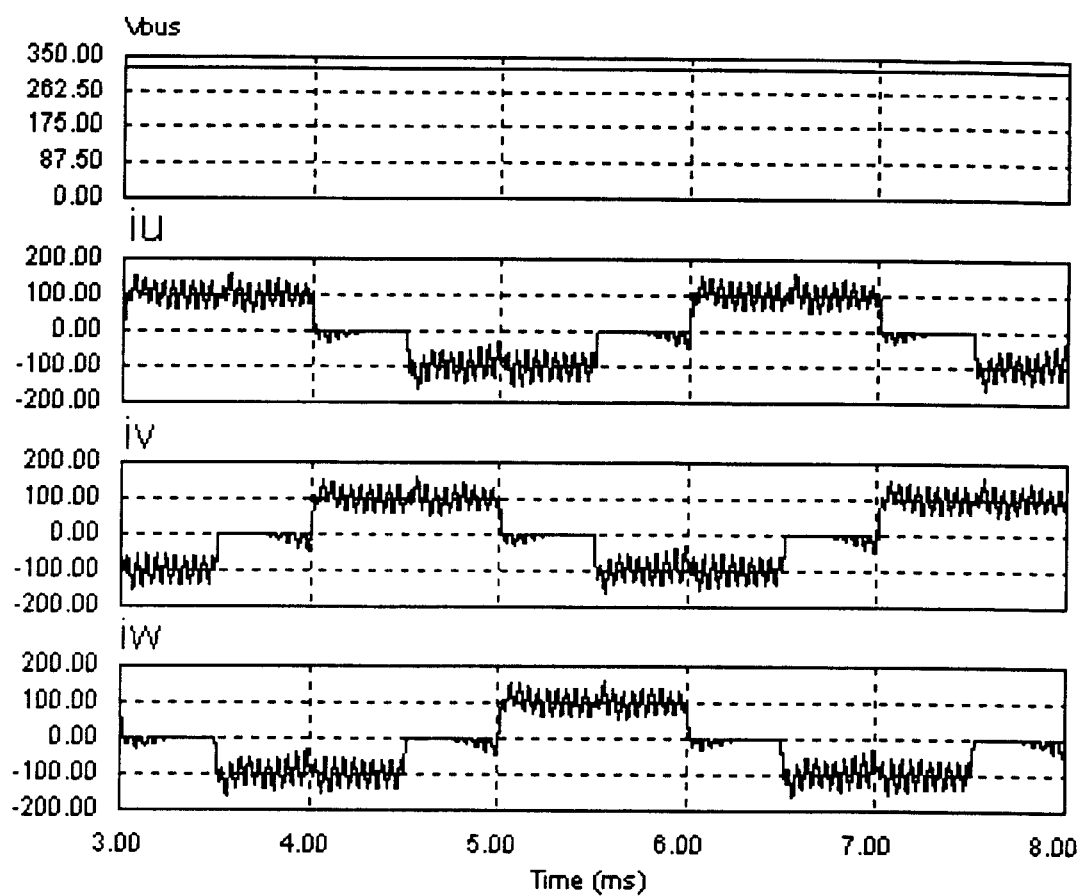
FIG. 6c is a graph of the bus voltage and phase currents in a conventional PWM inverter of the prior art, showing the current ripple components.
Figure 6D:
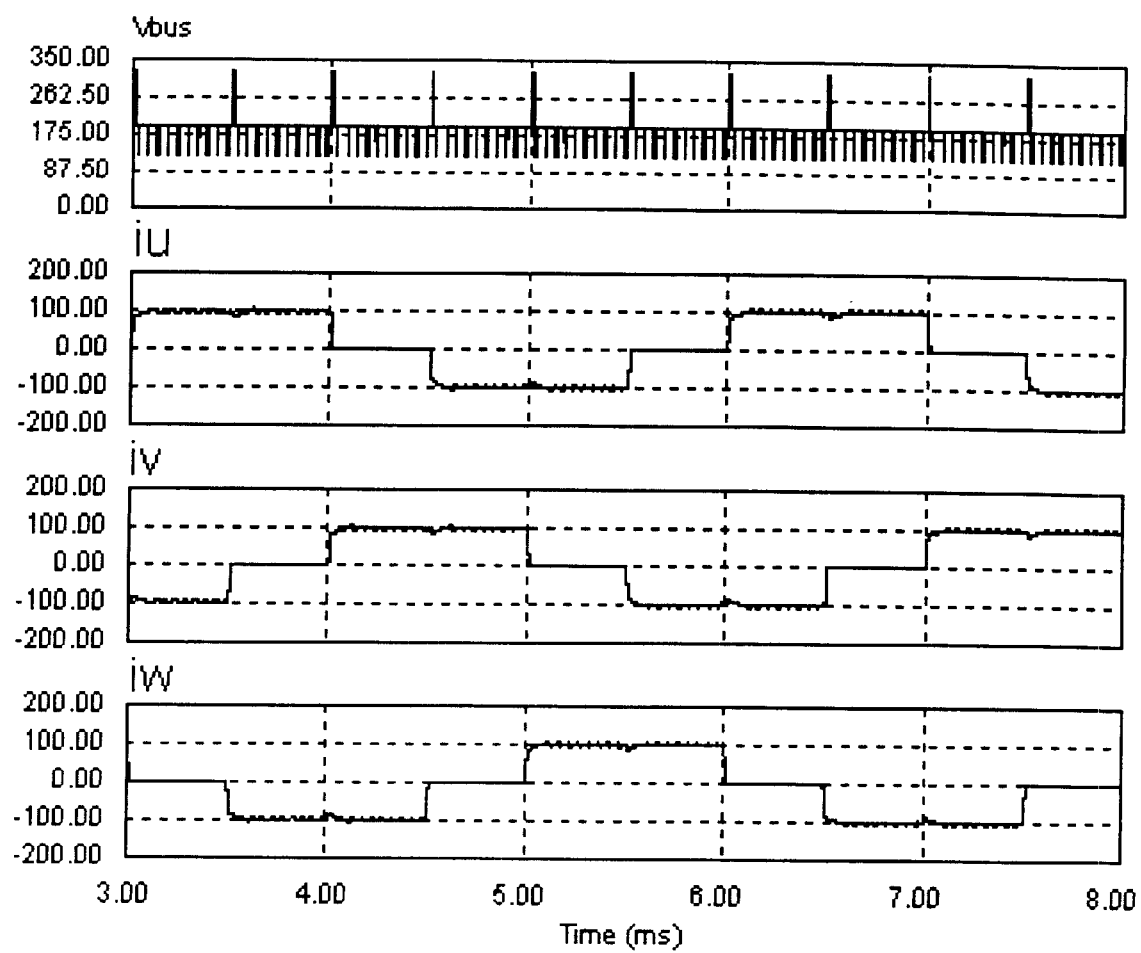
FIG. 6d is a graph of the bus voltage and phase currents in a multilevel dc voltage source inverter of the present invention, showing the current ripple components.

FIG. 6b shows curves of the calculated current ripple for this motor 11f with the conventional inverter 15a shown in FIG. 1a, and then with the five-increment dc link inverter 15f shown in FIG. 6a. The maximum current ripple is reduced by a factor of 5. It is noted that since the cell voltage is low, the cell switches 21f can be power MOSFETs as shown in FIG. 6a. This provides an additional option for ripple reduction by switching at a higher frequency, $f_{sw}$, as shown in equations (3) and (7). It is also useful to rotate the active cells so that the same amount of average power is drawn from each cell source. FIG. 6c shows the current ripple corresponding to the non-incremental dc voltage supply circuit 16a in FIG. 1a and FIG. 6d shows the current ripple for an incremental dc voltage supply circuit 16f of FIG. 6a.

While current ripple is best reduced when the voltage cells provide equal dc voltage, the invention would also reduce ripple in some measure where the voltage was divided into unequal increments.

Figure 7A:
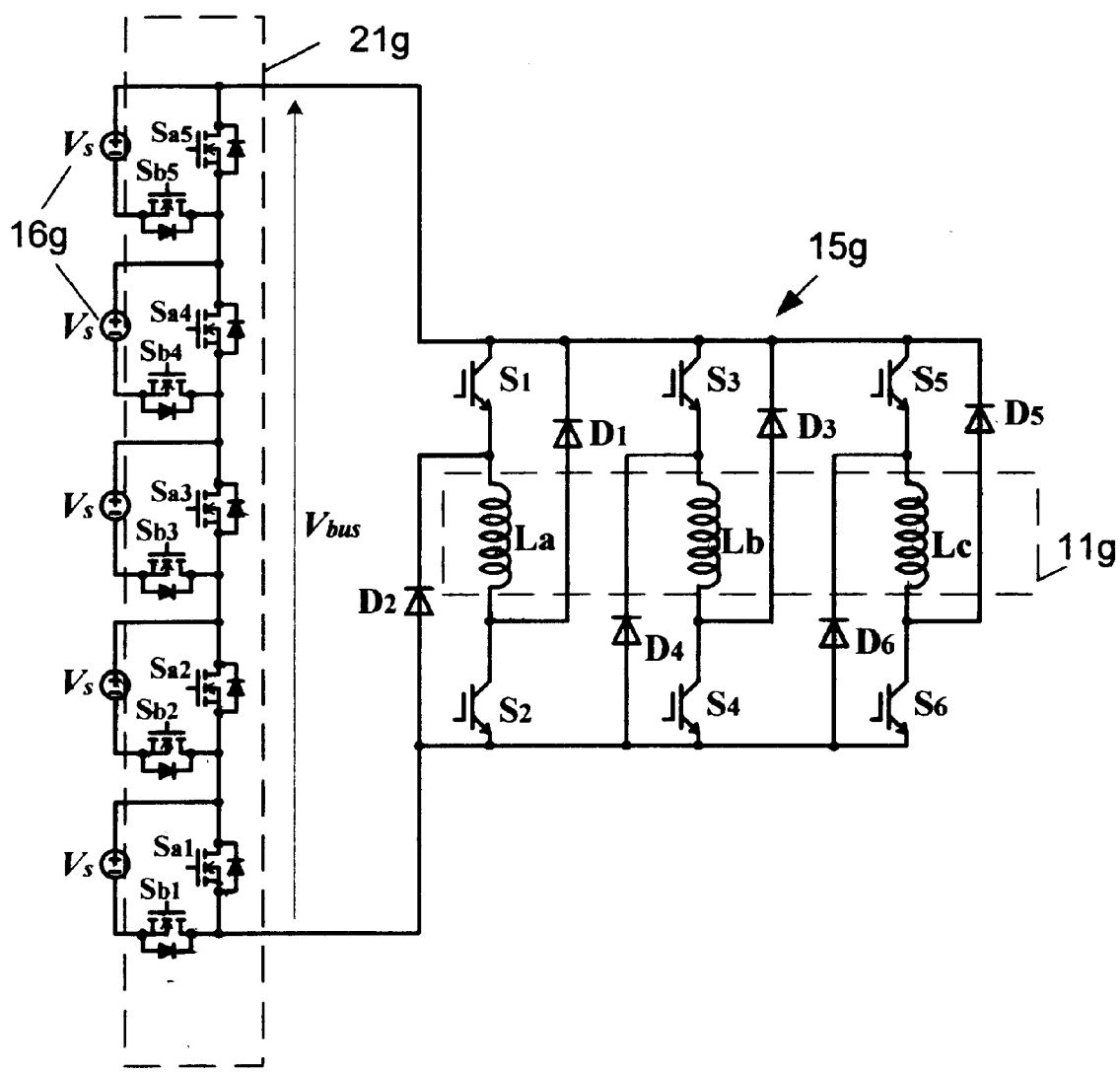
FIG. 7a is an electrical schematic of a second embodiment of the present invention applied to a switched reluctance motor.
Figure 7B:
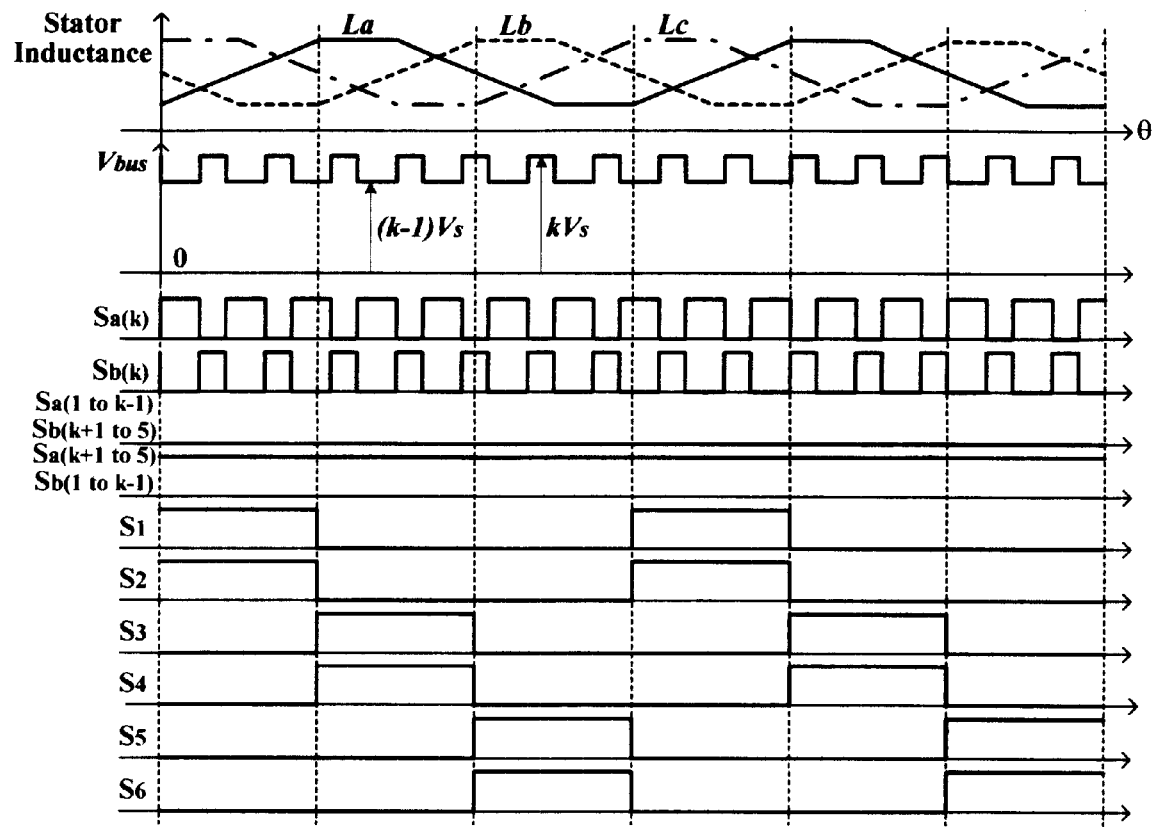

The concept can also be applied to switched reluctance motor drives. FIG. 7a shows an example of the invention for switched reluctance motor drives, in which a five-increment dc supply circuit 16g and 21g is employed to power a three-phase reluctance motor 11g represented by inductors La, Lb and Lc. FIG. 7b illustrates operating waveforms and switch gating signals of the inverter 15g. Switches S1–S6 are used to commutate the stator currents according to the rotor position, θ and motor current regulation is accomplished by selecting an adequate number, k (where k=1, 2, 3, 4 or 5), of active cells according to the motor speed and by having one of the active cells performing pulse width modulation. The remaining inactive cells are bypassed by turning on switches Sa (k+1 to 5) while maintaining their counterparts Sb (k+1 to 5) in an off condition.

Figure 8A:
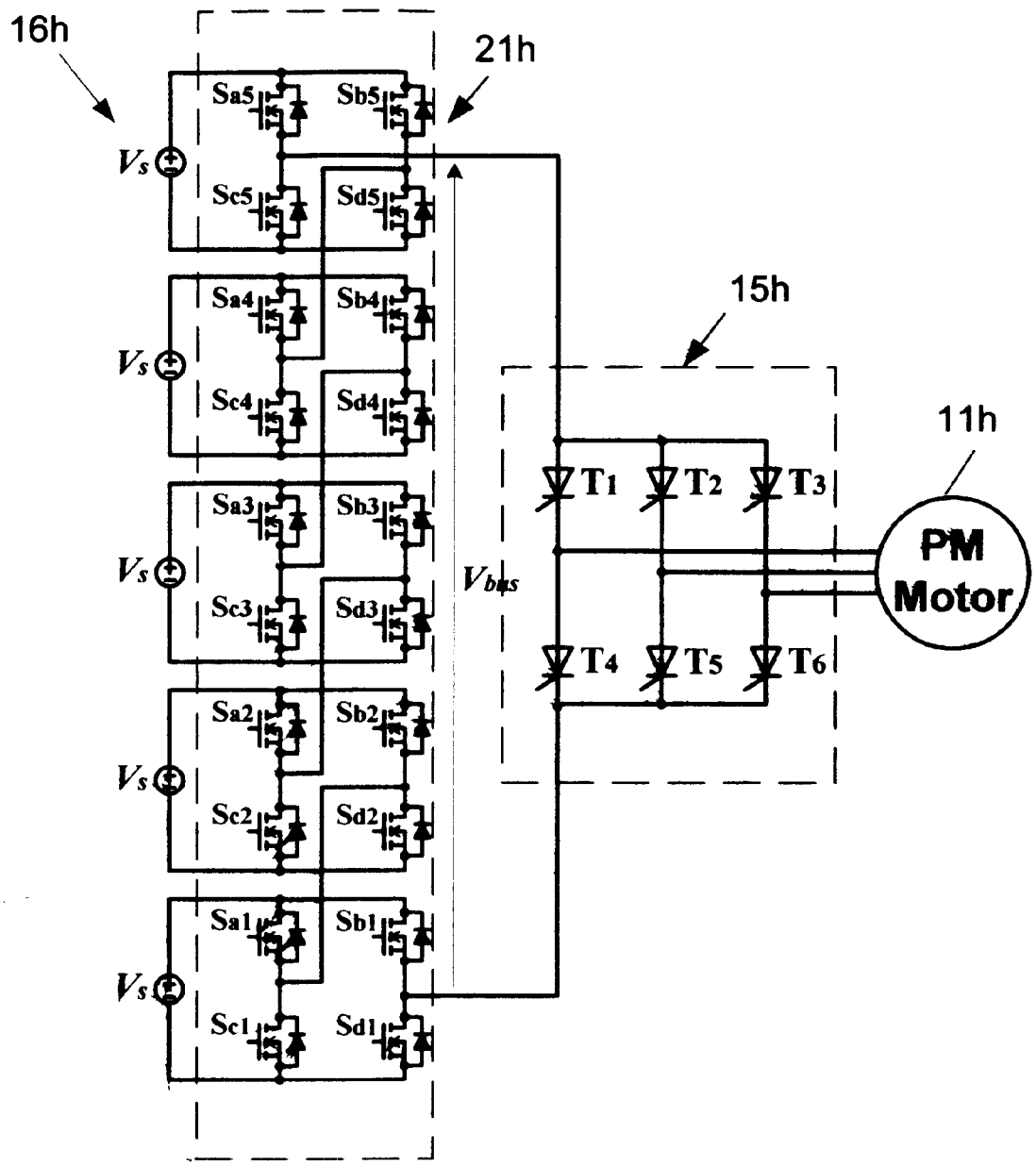
FIG. 8a is an electrical schematic of a third embodiment of the present invention using thyristors in the PWM inverter.
Figure 8B:
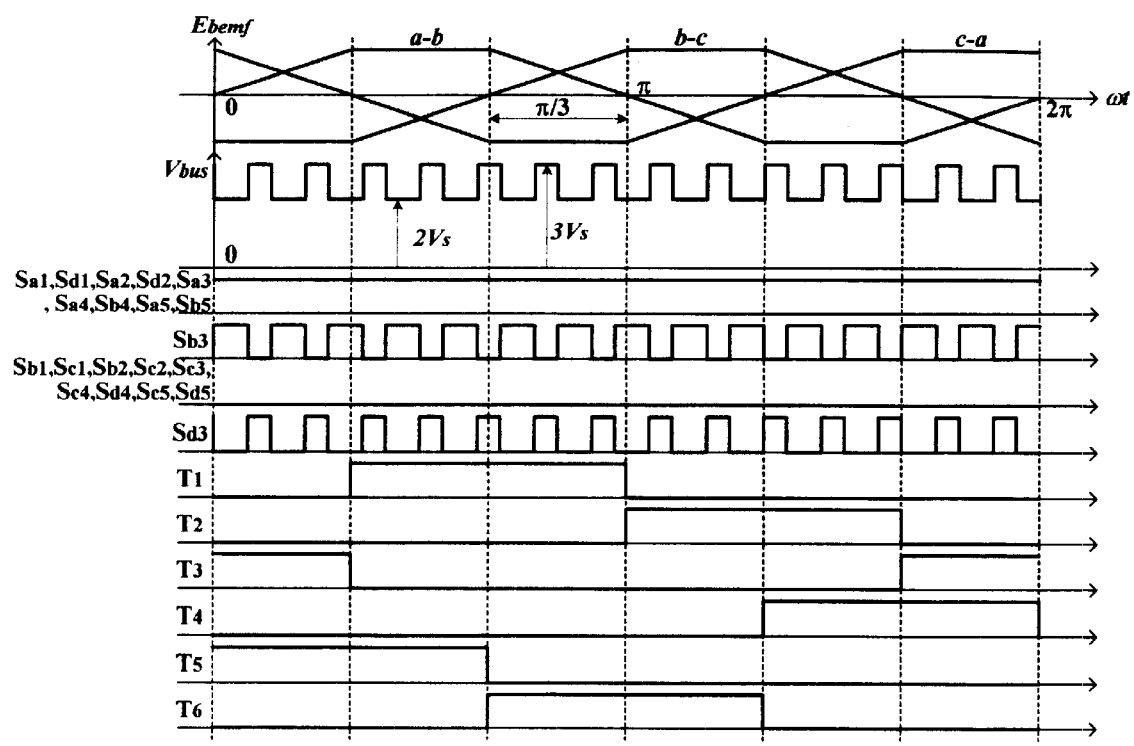
FIG. 8b is a graph of trapezoidal back emf and switching conduction periods vs. time for the PWM inverter of FIG. 8a in motoring mode.
Figure 8C:
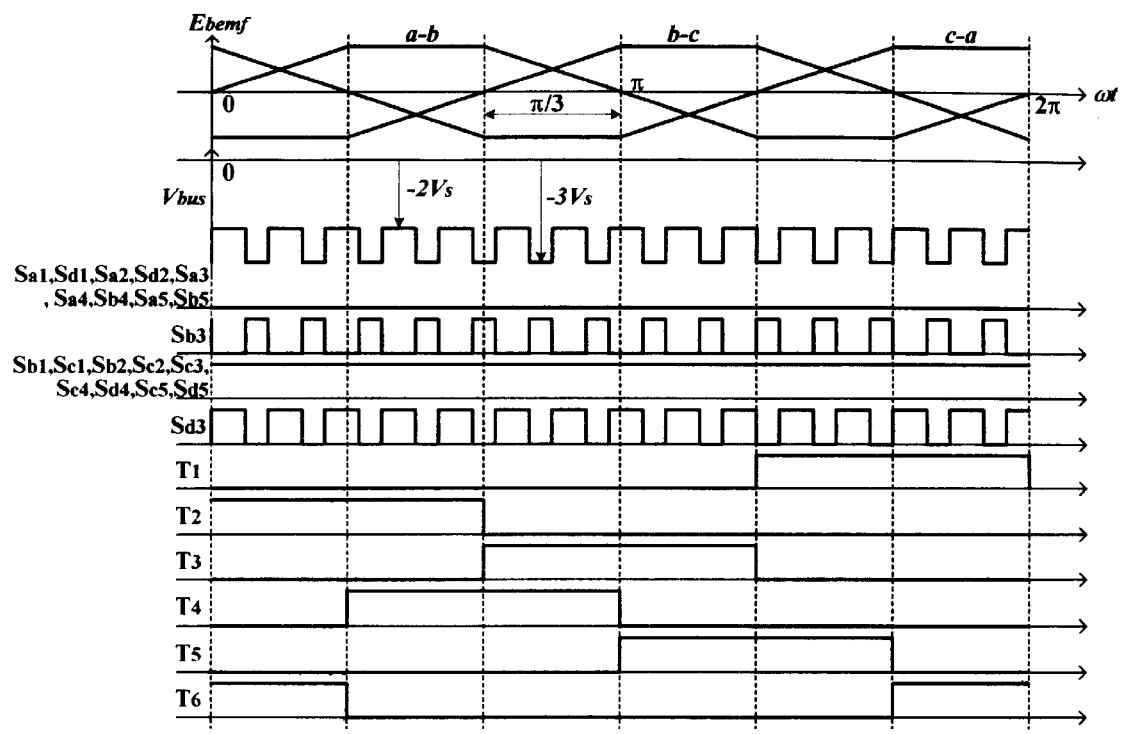
FIG. 8c is a graph of trapezoidal back emf and switching conduction periods vs. time for the PWM inverter of FIG. 8a in regenerating mode.

FIG. 8a shows an alternative configuration of a five-level dc supply circuit 16h, 21h employing MOSFETs, Sa1–Sa5, Sb1–Sb5, Sc1–Sc5, Sd1–Sd5, and an inverter 15h using thyristors, T1–T6. FIG. 8b illustrates back EMF, bus voltage and switch gating signal waveforms when the lower three voltage cells are active with the middle cell performing PWM and the motor 11h is in motoring mode. The bus voltage Vbus is positive. FIG. 8c illustrates back EMF, bus voltage and switch gating signal waveforms when the lower three cells are active with the middle cell doing PWM but the motor 11h is in a regeneration mode (the motor functions as a generator as power is fed back from the motor to the power supply). In this mode, the bus voltage Vbus is negative. The thyristor bridge inverter 15h is used to commutate the stator current and the current control is accomplished with the selection of active cell number and the pulse width modulation of one of the active cells.

Figure 9A:
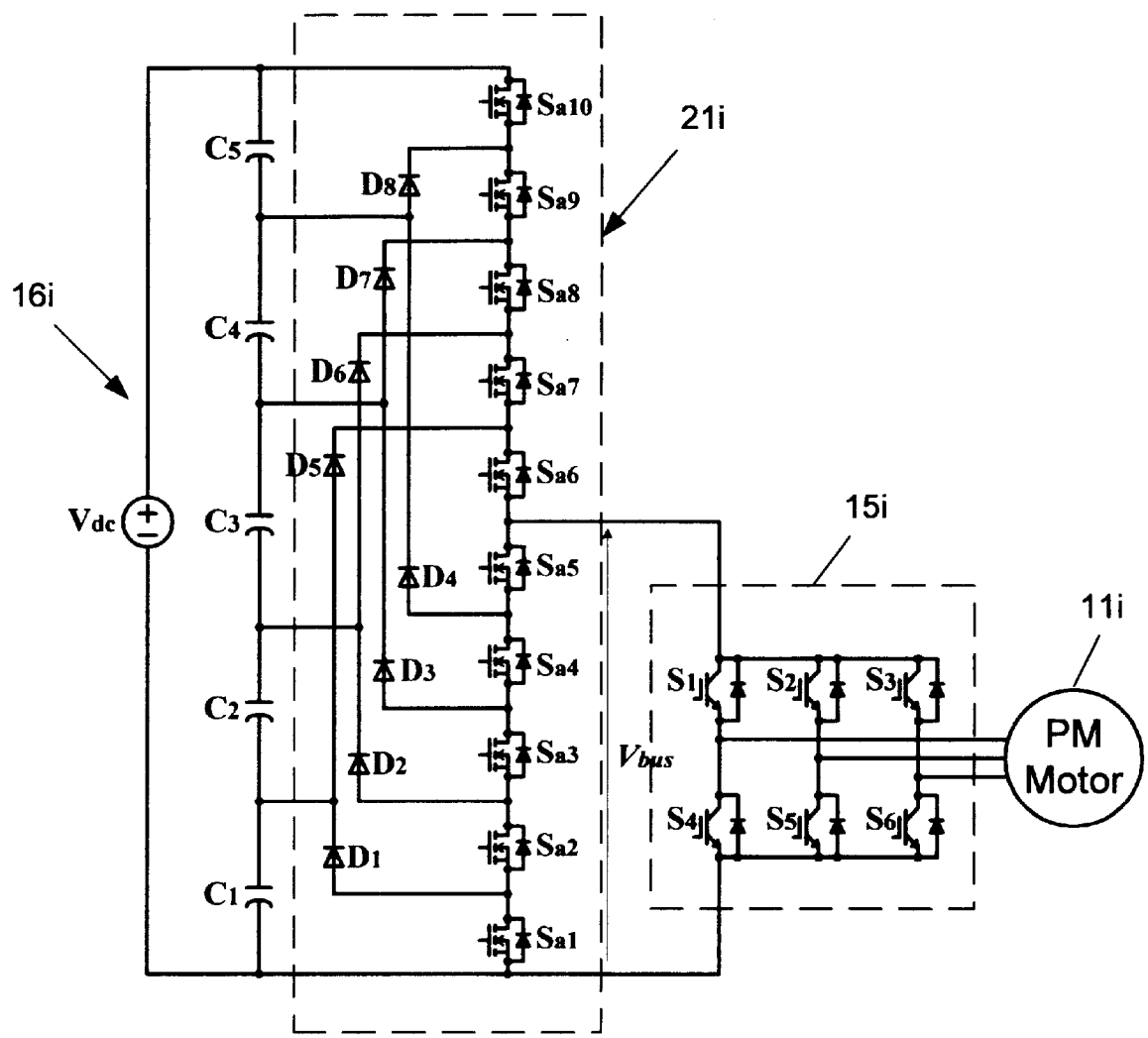
FIG. 9a is an electrical schematic of a fourth embodiment of the present invention using a diode clamped multilevel dc voltage source inverter.
Figure 9B:
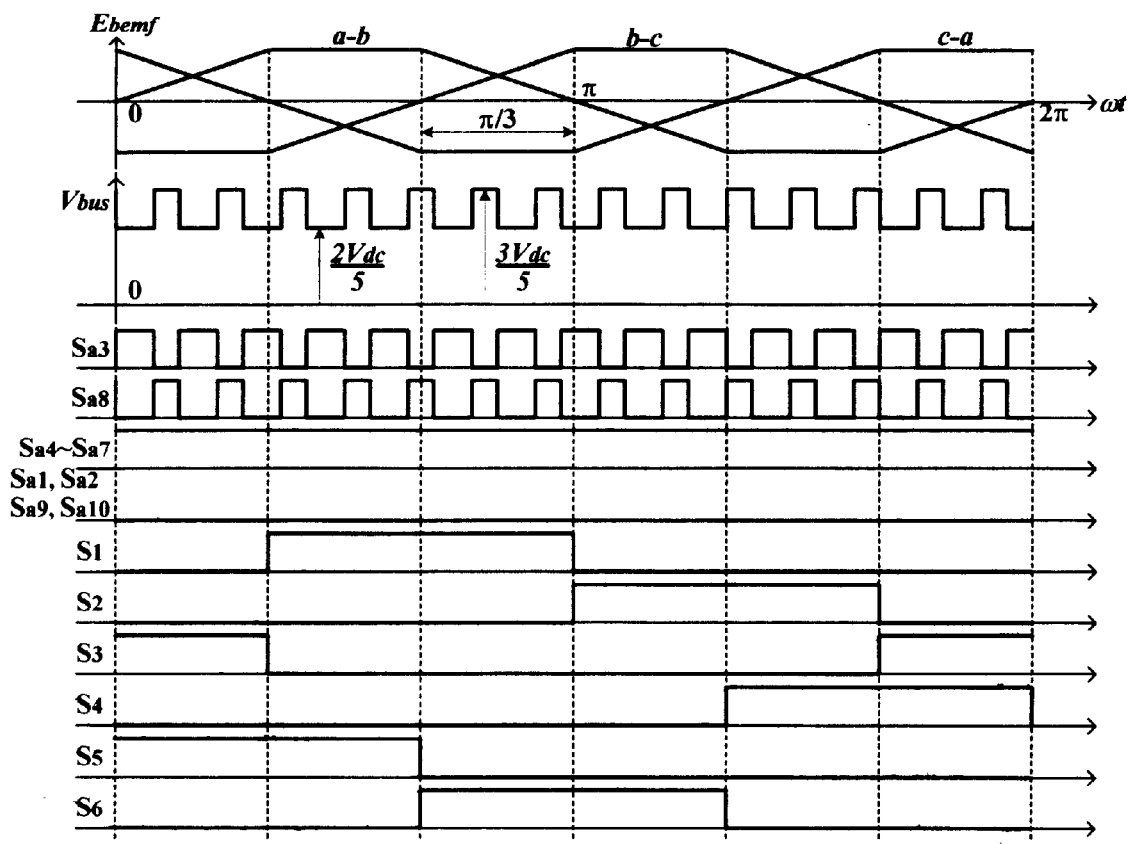

FIG. 9a shows an alternative configuration using a diode clamped multilevel dc voltage supply circuit 16i, 21i. The five capacitors, C1–C5 equally divide the dc source voltage, Vdc. FIG. 9b illustrates back EMF, bus voltage and switch gating signal waveforms when the lower three capacitors, C1–C3 are active.

This has been a description of the preferred embodiments of the invention. The present invention is intended to encompass additional embodiments including modifications to the details described above which would nevertheless come within the scope of the following claims.

I claim:

1. A circuit for controlling a three-phase machine having a stator with stator windings and a rotor, the circuit comprising:
    a plurality of commutation switches which are connected to supply current to the stator windings;
    a plurality of dc source connections for receiving a plurality of incremental dc voltages and for applying a selected sum of said incremental dc voltages to said plurality of commutation switches to provide a base dc voltage, while controlling one of the incremental dc voltages to provide a varying pulsed signal to said commutation switches relative to said base dc voltage;

at least one sensor for sensing a parameter of the motor from which a speed and rotor position of the motor can be determined; and a controller responsive to said sensor for determining the speed and rotor position of the motor, said controller being connected for control of said dc source connections to change base dc voltage in response to changes in speed of the motor without increasing current ripple in the stator windings substantially above a current ripple resulting from applying the varying pulsed signal derived from one of the incremental dc voltages to said commutation switches, said controller being connected also for control of said commutation switches to sequentially excite the stator windings of said motor.

2. The circuit of claim 1, wherein said commutation switches are semiconductor devices whose turn-on and turn-off can be controlled through a gating terminal, and a plurality of diodes, each in parallel connection to a respective one of the plurality of said commutation switches for allowing conduction in a reverse direction to bypass each respective primary commutation switch.

3. The circuit of claim 2, wherein said dc source connections include a plurality of control switches for controlling connection to a plurality of dc sources.

4. The circuit of claim 3, wherein at least one of the dc source connections includes at least two control switches, comprising a first control switch for applying the incremental dc voltage to said commutation switches and a second control switch for bypassing the incremental dc voltage and wherein the first and second control switches perform pulse width modulation in response to signals from the controller.

5. The circuit of claim 4, wherein said dc source connection also includes a capacitor for storing an incremental voltage derived from an external voltage source and a diode for clamping the voltage across each of said first and second control switches to said incremental voltage.

6. The circuit of claim 4, wherein said commutation switches are adapted for connection to a stator of a PM motor.

7. The circuit of claim 4, wherein said commutation switches are adapted for connection to a stator of a switched reluctance motor.

8. The circuit of claim 1, wherein said commutation switches are semiconductor devices in which turn-on can be controlled but in which turn-off cannot be controlled through a gating terminal.

9. The circuit of claim 8, wherein said dc source connections include a plurality of control switches for controlling connection to a plurality of dc sources.

10. The circuit of claim 8, wherein said dc source connection for each external dc voltage source includes a bridge network of four control switches for operating alternatively in the motoring mode or in the regenerating mode.

11. The circuit of claim 1, wherein the incremental dc voltages are not all equal.

12. A method of controlling a three-phase machine having a stator with stator windings and a rotor, the circuit comprising:

turning on in sequence a plurality of primary commutation switches connected to supply current to the stator windings;

receiving a plurality of incremental dc voltages and selecting a sum of the incremental dc voltages to apply to said plurality of commutation switches as a base dc voltage;

varying one of the incremental dc voltages to apply a varying pulsed signal to the commutation switches in relation to said base dc voltage;

sensing a parameter of the motor from which a speed of the motor can be determined;

determining a speed of the motor, and wherein the base dc voltage is selected in response to changes in speed of the motor without increasing current ripple in the stator windings substantially above a current ripple resulting from varying said one of the incremental dc voltages to apply the varying pulsed signal to said commutation switches; and determining a rotor position of the motor, and turning on and off said commutation switches to sequentially excite the stator windings of said motor.

13. The method of claim 12, further comprising dividing a dc voltage from an external dc voltage source into incremental dc voltages.

14. The method of claim 12, current from said commutation switches is supplied to a stator of a PM motor.

15. The method of claim 12, current from said commutation switches is supplied to a switched reluctance motor.

16. The method of claim 12, further comprising controlling signals applied to the primary commutation switches from said motor to direct the commutation sequences for operating in the motoring mode or for operating in the regenerating mode.

17. The method of claim 12, wherein the incremental dc voltages are not all equal.

18. A circuit for controlling a three-phase machine having a stator with stator windings and a rotor, the circuit comprising:

a plurality of commutation switches which are connected to supply current to the stator windings;

a plurality of voltage-controlled cells in cascade arrangement for applying a resulting dc voltage to said plurality of commutation switches, said resulting dc voltage comprising at least one of a plurality of incremental dc voltages corresponding to said plurality of voltage-controlled cells, at least one of said cells also providing a varying pulsed signal to said commutation switches;

at least one sensor for sensing a parameter of the motor from which a speed and rotor position of the motor can be determined; and a controller responsive to said sensor for determining the speed and rotor position of the motor, said controller being connected for control of said dc source connections to change said resulting dc voltage in response to changes in speed of the motor without increasing current ripple in the stator windings substantially above a current ripple resulting from the varying pulsed signal supplied from said one of the voltage-controlled cells to said commutation switches.

19. The circuit of claim 18, wherein at least one of the voltage-controlled cells includes at least two control switches, comprising a first control switch for applying the incremental dc voltage to said commutation switches and a second control switch for bypassing the incremental dc voltage and wherein the two control switches perform pulse width modulation in response to signals from the controller.

* * * * *

UNITED STATES PATENT AND TRADEMARK OFFICE
CERTIFICATE OF CORRECTION

PATENT NO.     : 6,577,087 B2                                         Page 1 of 1
DATED          : June 10, 2003
INVENTOR(S)    : Gui-Jia Su It is certified that error appears in the above-identified patent and that said Letters Patent is hereby corrected as shown below:

<u>Column 5,</u>
Line 56, "5a and 5b" should be -- Sa and Sb --.

Signed and Sealed this

Eighteenth Day of November, 2003

JAMES E. ROGAN
*Director of the United States Patent and Trademark Office*